United States Patent
Puch et al.

(10) Patent No.: US 11,440,231 B2
(45) Date of Patent: Sep. 13, 2022

(54) PROCESS FOR THE PREPARATION OF A REINFORCED POLYAMIDE BY EXTRUSION

(71) Applicant: BASF SE, Ludwigshafen (DE)

(72) Inventors: Florian Puch, Ludwigshafen (DE); Shyam Sundar Sathyanarayana, Ludwigshafen (DE); Yeonsuk Roh, Wyandotte, MI (US); Natalie Beatrice Janine Herle, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 821 days.

(21) Appl. No.: 16/326,722

(22) PCT Filed: Aug. 16, 2017

(86) PCT No.: PCT/EP2017/070786
§ 371 (c)(1),
(2) Date: Feb. 20, 2019

(87) PCT Pub. No.: WO2018/036885
PCT Pub. Date: Mar. 1, 2018

(65) Prior Publication Data
US 2019/0202102 A1    Jul. 4, 2019

(30) Foreign Application Priority Data

Aug. 23, 2016  (EP) .................................. 16185326

(51) Int. Cl.
| | |
|---|---|
| *B29C 48/00* | (2019.01) |
| *B29C 67/24* | (2006.01) |
| *C08J 5/04* | (2006.01) |
| *B29C 48/14* | (2019.01) |
| *C08K 3/04* | (2006.01) |
| *C08L 77/02* | (2006.01) |
| *B29K 77/00* | (2006.01) |
| *B29K 307/04* | (2006.01) |
| *B29C 48/395* | (2019.01) |
| *B29C 48/68* | (2019.01) |

(52) U.S. Cl.
CPC .......... *B29C 48/022* (2019.02); *B29C 48/144* (2019.02); *B29C 67/246* (2013.01); *C08J 5/042* (2013.01); *C08K 3/04* (2013.01); *C08L 77/02* (2013.01); *B29C 48/397* (2019.02); *B29C 48/682* (2019.02); *B29C 48/683* (2019.02); *B29K 2077/00* (2013.01); *B29K 2307/04* (2013.01)

(58) Field of Classification Search
CPC ... B29C 48/022; B29C 48/144; B29C 67/246; B29C 48/397; B29C 48/682; B29C 48/683; B29C 48/59; B29C 48/802; C08J 5/042; C08K 3/04; C08L 77/02; C08G 69/16; C08G 69/20; C08G 69/24; B29K 2077/00; B29K 2307/04; B29K 2105/0014; B29K 2105/06; B29B 9/10
See application file for complete search history.

(56) References Cited

U.S. PATENT DOCUMENTS

| | | | |
|---|---|---|---|
| 5,459,168 A | 10/1995 | Nasr et al. | |
| 6,165,399 A * | 12/2000 | Guntherberg | ........... B29C 48/76 366/85 |
| 2004/0058214 A1 | 3/2004 | Mehler et al. | |
| 2004/0144963 A1 | 7/2004 | Braig et al. | |
| 2005/0090382 A1* | 4/2005 | Schmid | .................. C08G 69/20 548/402 |
| 2010/0019210 A1 | 1/2010 | Weber et al. | |
| 2010/0286343 A1 | 11/2010 | Burghardt et al. | |
| 2016/0046766 A1* | 2/2016 | Fogle | ..................... B29C 48/40 528/335 |
| 2018/0142063 A1 | 5/2018 | Niedzwiecki et al. | |
| 2018/0208880 A1 | 7/2018 | Kniesel et al. | |
| 2018/0265622 A1 | 9/2018 | Roh et al. | |
| 2019/0055341 A1 | 2/2019 | Prissok et al. | |

FOREIGN PATENT DOCUMENTS

| | | |
|---|---|---|
| AU | 2017/303416 A1 | 2/2019 |
| DE | 10243592 A1 | 4/2004 |
| DE | 10259 498 A1 | 7/2004 |
| EP | 2049597 A2 | 4/2009 |
| EP | 2228351 A1 | 9/2010 |
| JP | H06172515 A | 6/1994 |

(Continued)

OTHER PUBLICATIONS

International Search Report for PCT Patent Application No. PCT/EP2017/070786, dated Oct. 17, 2017.
Fu, X., et al., "A Facile Route to Prepare Few-Layer Graphene/Polyamide 6 Nanocomposites by Liquid Reactive Extrusion," *RSC Advances* 5, No. 94 (2015), pp. 77316-77323.
Hollemann, A.F., et al., *Textbook of Inorganic Chemistry*, International Edition in English, vol. 2, No. 2, p. 146.
Hu, J., , et al., "Chemistry and Physics in One Dimension: Synthesis and Properties of Nanowires and Nanotubes," *Accounts of Chemical Research*, vol. 32, No. 5 (1999), pp. 435-445.
Hänsch, S., et al., "Filler Dispersion and Electrical Properties of Polyamide 12/MWCNT—Nanocomposites Produced in Reactive Extrusion Via Anionic Ring-Opening Polymerization," *Composites Science and Technology* 72, No. 14 (2012), pp. 1671-1677.

(Continued)

*Primary Examiner* — Jacob T Minskey
*Assistant Examiner* — S. Behrooz Ghorishi
(74) *Attorney, Agent, or Firm* — Marshall, Gerstein & Borun LLP

(57) ABSTRACT

The present invention relates to a process for the production of a reinforced polyamide (rP) in an extruder. In this process, a first mixture (M1), a second mixture (M2) and a third mixture (M3) are added into the extruder, and subsequently at least one carbon material is added to obtain a carbon containing polymerizable mixture (cpM) in the extruder. This carbon containing polymerizable mixture (cpM) is polymerized and subsequently devolatilized to obtain the reinforced polyamide (rP). Furthermore, the present invention relates to the reinforced polyamide (rP) obtainable by the inventive process.

15 Claims, No Drawings

(56) References Cited

FOREIGN PATENT DOCUMENTS

| | | |
|---|---|---|
| JP | H07149816 A | 6/1995 |
| JP | 2005082809 A | 3/2005 |
| JP | 2013-538928 A | 10/2013 |
| KR | 20050106020 A | 11/2005 |
| WO | WO-2004/074347 A1 | 9/2004 |
| WO | WO-2012/045806 A1 | 4/2012 |
| WO | WO-2016/182918 A1 | 11/2016 |
| WO | WO-2017/017176 A1 | 2/2017 |
| WO | WO-2017/058551 A1 | 4/2017 |
| WO | WO-2017/144492 A1 | 8/2017 |
| WO | WO-2017/216022 A1 | 12/2017 |
| WO | WO-2017/216023 A1 | 12/2017 |
| WO | WO-2018/009452 A1 | 1/2018 |
| WO | WO-2018/019728 A1 | 2/2018 |

OTHER PUBLICATIONS

Park, H.S., et al., "Preparation of Nylon 6/MWNT Composites by Reactive Extruder," *Polymeric Materials: Science & Engineering*, vol. 95, No. 468 (2006).

\* cited by examiner

PROCESS FOR THE PREPARATION OF A REINFORCED POLYAMIDE BY EXTRUSION

CROSS-REFERENCE TO RELATED APPLICATIONS

This is U.S. national phase of International Application No. PCT/EP2017/070786, filed Aug. 16, 2017, which claims the benefit of European Application No. 16185326.2, filed Aug. 23, 2016.

The present invention relates to a process for the production of a reinforced polyamide (rP) in an extruder. In this process, a first mixture (M1), a second mixture (M2) and a third mixture (M3) are added into the extruder, and subsequently at least one carbon material is added to obtain a carbon containing polymerizable mixture (cpM) in the extruder. This carbon containing polymerizable mixture (cpM) is polymerized and subsequently devolatilized to obtain the reinforced polyamide (rP). Furthermore, the present invention relates to the reinforced polyamide (rP) obtainable by the inventive process.

Polyamides are generally semicrystalline polymers which are of particular industrial importance because they feature very good mechanical properties. In particular, they have high strength, stiffness and toughness, good chemical resistance and also high abrasion resistance and tracking resistance. These properties are particularly important for the production of injection moldings. High toughness is particularly important for the use of polyamides as packaging films. The properties of polyamides lead to the use in industry for the production of textiles such as fishing lines, climbing ropes and carpeting. Polyamides are also used for the production of wall plugs, screws and bolts and cable binders. Polyamides are also used as adhesives, coatings, and coating materials.

Polyamide moldings have increasingly been used in recent years as materials in their own right and as replacement for metallic materials. In particular, fiber reinforced polyamide moldings are used for this purpose. Various processes are described in the prior art for the production of fiber reinforced polyamide moldings. By way of example, a mold in which the molding is to be produced can comprise a fiber material and the corresponding monomers for the production of the polyamide can be charged to the mold whereupon the polymerization of the monomers is situated in situ. This generally requires only heating to a temperature that is above the melting point of the monomers and not above the melting point of the polyamide to be produced.

Another possible method for the production of polyamide moldings comprising fiber reinforcement is described by way of example in X. Fu, *RSC Adv.* 2015, 5, 77316-77323. Here, a few-layer graphene/polyamide 6 nanocomposite is prepared by liquid reactive extrusion. In the process described, first a few-layer graphene powder is added to molten ε-caprolactam and the obtained mixture is treated with an ultrasonic cell crusher. To this mixture, NaOH (sodium hydroxide) is added as a catalyst and TDI (toluene-2,4-diisocyanate) is added as activator. Subsequently, the obtained mixture is introduced into a twin-screw extruder and polymerized therein at a temperature in the range from 120 to 240° C.

Another possible method for the production of a reinforced polyamide is disclosed in H. S. Park, *PMSE Preprints* 2006, 95, 468. In the process disclosed, a mixture comprising multiwalled carbon nanotubes, a catalyst, an initiator and caprolactam is fed into an extruder through the main hopper and polymerized therein.

EP 2 228 351 discloses a process for reinforcing a polyamide with glass fibers. In this process, the glass fibers are mixed with a lactam monomer and a polymerization catalyst to form a polymerization mixture which can then be polymerized. The polymerization is carried out at temperatures below the melting point of the resulting polyamide. EP 2 228 351 also discloses a process in which the glass fiber, caprolactam monomer and sodium caprolactam catalyst are fed together in an extruder to be mixed and heated so that the polymerization initiates and completes in the extruder.

S. Hänsch et al.; "*Filler dispersion and electrical properties of polyamide 12/MWCNT-nanocomposites produced in reactive extrusion via anionic ring-opening polymerization*", Composite Science and Technology 2012, vol. 72, pages 1671-1677 discloses a study of the in situ polymerization of lauryl lactam in the presence of 1 to 5 wt. % multiwalled carbon nanotubes (MWCNTs). In this process monomer, activator, initiator and MWCNTs are simultaneously filled into a microcompounder and premixed for 5 min at 170° C. Subsequently, the microcompounder is heated to the polymerization temperature and the mixture is polymerized.

US 2010/0286343 discloses a similar process as described in EP 2 228 351. In this process, as well a mixture comprising a glass fiber, a catalyst and a lactam is added into an extruder and polymerized therein.

The reinforced polyamides obtained according to the processes described in the prior art often comprise a high content of residual monomer, a low molecular weight and often exhibit poor mechanical properties.

There is therefore a need for further processes for the production of reinforced polyamides (rP) which can be used for the preparation of moldings that exhibit good mechanical stability.

The object underlying the present invention is therefore the provision of a process for the production of a reinforced polyamide (rP). The process should in particular be more simple and more cost efficient than the processes described in the prior art.

Said object is achieved via a process for the production for a reinforced polyamide (rP) in an extruder wherein the extruder comprises a reaction zone and a devolatilization zone, wherein the reaction zone comprises a first section, a second section, and a third section, comprising the steps:

a) provision of a first mixture (M1) comprising component
   (A) at least one lactam,
b) provision of a second mixture (M2) comprising component
   (B) at least one catalyst,
c) provision of a third mixture (M3) comprising component
   (C) at least one activator,
d) addition of the first mixture (M1), the second mixture (M2) and the third mixture (M3) into the first section of the reaction zone of the extruder to obtain a polymerizable mixture (pM) in the extruder,
e) addition of at least one carbon material into the second section of the reaction zone of the extruder to the polymerizable mixture (pM) obtained in step d), to obtain a carbon containing polymerizable mixture (cpM) in the extruder,
f) polymerization of the carbon containing polymerizable mixture (cpM) obtained in step e) in the third section of the reaction zone of the extruder to obtain a reinforced raw polyamide (rrP),
g) devolatilization of the reinforced raw polyamide (rrP) obtained in step f) in the devolatilization zone of the extruder to obtain the reinforced polyamide (rP).

It has surprisingly been found that the inventive reinforced polyamide (rP) exhibits mechanical properties superior to those of the reinforced polyamides disclosed in the prior art. In particular, the obtained reinforced polyamide (rP) and also moldings made thereof exhibit a high E-modulus and a high elongation at break. Furthermore, the Charpy notched impact strength is particularly high as well as the tensile strength.

Moreover, the obtained reinforced polyamide (rP) has a particularly low content of monomer (component (A)), and the reinforced polyamide (rP) exhibits a particularly uniform distribution of the at least one carbon material, and this provides particularly good mechanical stability and reinforcement of a molding obtained from the reinforced polyamide (rP).

The reinforced polyamides (rP) obtained by the inventive process moreover exhibit a high molecular weight.

Furthermore, the inventive process can be carried out very quick. For example, the residence time of component (A), at least one lactame, is typically in the range from 0.1 to 10 min (minutes), preferably in the range from 0.5 to 5 min and most preferably in the range from 1 to 3 min.

The process of the invention is explained in more detail below.

Extruder

According to the present invention, the process for the production of a reinforced polyamide (rP) is carried out in an extruder.

Suitable extruders are known to the skilled person. Preferably, the extruder is selected from the group consisting of single-screw extruders, twin-screw extruders and multiple-screw extruders.

The present invention therefore also provides a process wherein the extruder is selected from the group consisting of single screw extruders, twin screw extruders and multiple screw extruders.

Single-screw extruders, twin-screw extruders and multiple-screw extruders are known to the skilled person and are for example described in C. Rauwendaal: *Polymer extrusion, Carl Hanser Verlag GmbH & Co. KG, 5th edition* (16 Jan. 2014).

Therefore, the extruder typically comprises a screw. Preferably, the screw has diameter in the range from 18 to 140 mm, more preferably in the range from 25 to 110 mm and most preferably in the range from 25 to 92 mm.

The present invention therefore also provides a process wherein the extruder comprises a screw having a diameter in the range from 18 to 140 mm.

To the person skilled in the art, it should be clear that if the extruder is a twin-screw extruder or a multiple-screw extruder, the diameter of the screw refers to the diameter of one of the screws comprised in the extruder. Particularly preferred, if the extruder is a twin screw extruder or a multiple screw extruder, then all screws comprised in the extruder have the same diameter.

The screw rotational speed in the extruder is typically in the range from 50 to 1 200 rpm, preferably in the range from 100 to 1 000 rpm and more preferably in the range from 300 to 700 rpm.

It is usual that the extruder is heated or cooled during the process of the invention. The heating and cooling of the extruder can be achieved by any of the methods known to the skilled person. It is usual that the extruder is heated via the friction of heat that is liberated during the mixing of components (A), (B) and (C) and the heat that is liberated during the polymerization of components (A), (B) and (C). It is also possible that the extruder is heated externally, for example via circulation of a liquid within the extruder barrel. This liquid can also be used for the cooling of the extruder. Moreover, it is possible that the extruder comprises an electrical barrel heater to heat and cool the extruder. This embodiment is preferred. The aforesaid methods for heating and cooling the extruder are known per se to the person skilled in the art.

The temperatures given in the present invention and referring to the extruder, for example the temperatures of the different sections of the reaction zone and the temperature of the devolatilization zone, therefore, are meant to be jacket temperatures of the extruder.

"Jacket temperature of the extruder" means the temperature of the jacket of the extruder. The jacket temperature of the extruder is therefore the temperature of the external wall of the extruder barrel.

The jacket temperature of the extruder can be higher than the temperature of the components in the extruder, and it is equally possible that the jacket temperature of the extruder is lower than the temperature of the components in the extruder. By way of example, it is possible that the jacket temperature of the extruder is initially higher than the temperature of the components in the extruder when the components are being heated. When the components in the extruder are being cooled, it is possible that the jacket temperature of the extruder is lower than the temperature of the components in the extruder.

According to the present invention, the extruder comprises a reaction zone and a devolatilization zone.

In the reaction zone, components (A), (B) and (C) are added to the extruder as part of the first mixture (M1), the second mixture (M2) and the third mixture (M3). Furthermore, the at least one carbon material is added in the reaction zone. Moreover, in the reaction zone, components (A), (B) and (C) are polymerized to obtain the reinforced raw polyamide/rrP).

In the devolatilization zone, volatile components such as monomers (component (A)) and volatile reaction products of the polymerization of components (A), (B) and (C) such as water are removed from the reinforced raw polyamide (rrP) to obtain the reinforced polyamide (rP).

The reaction zone can have any length. For example, the length of the reaction zone is dependent on the diameter of the screw of the extruder. Preferably, the length of the reaction zone is in the range from 16 to 60 times the diameter of the screw of the extruder, more preferably the length of the reaction zone is in the range from 20 to 48 times the diameter of the screw of the extruder, and most preferably, the length of the reaction zone is in the range from 24 to 40 times the diameter of the screw of the extruder.

Another object of the present invention is therefore also a process wherein the extruder comprises a screw and wherein the length of the reaction zone is in the range from 16 to 60 times the diameter of the screw of the extruder.

Preferably, the extruder is divided into barrel elements. A barrel element, preferably, has a length which is four times the diameter of the screw of the extruder. Therefore, the reaction zone preferably comprises in the range from 4 to 15 barrel elements, preferably in the range from 5 to 12 barrel elements, and most preferably in the range from 6 to 10 barrel elements.

According to the present invention, the reaction zone comprises a first section, a second section and a third section.

The length of the first section of the reaction zone of the extruder is usually in the range from 4 to 12 times the diameter of the screw of the extruder, and more preferably in the range from 4 to 8 times the diameter of the screw of the extruder.

Another object of the present invention is therefore also a method, wherein the extruder comprises a screw and wherein the first section of the reaction zone of the extruder has a length in the range from 4 to 12 times the diameter of the screw of the extruder.

The second section of the reaction zone of the extruder usually has a length in the range from 4 to 12 times the diameter the screw of the extruder, and preferably in the range from 4 to 8 times the diameter of the screw of the extruder.

Preferably, the third section of the reaction zone of the extruder has a length in the range from 12 to 44 times the diameter of the screw of the extruder, more preferably in the range from 16 to 36 times the diameter of the screw of the extruder, and most preferably in the range from 20 to 28 times the diameter of the screw of the extruder.

Another object of the present invention is therefore also a method, wherein the extruder comprises a screw and wherein the third section of the reaction zone of the extruder has a length in the range from 12 to 44 times the diameter of the screw of the extruder.

It is therefore preferred that the extruder comprises a screw and that the reaction zone of the extruder comprises
a first section having a length in the range from 4 to 12 times the diameter of the screw of the extruder,
a second section, having a length in the range from 4 to 12 times the diameter of the screw of the extruder, and
a third section having a length in the range from 12 to 44 times the diameter of the screw of the extruder.

Particularly preferred, the reaction zone of the extruder comprises
a first section having a length in the range from 4 to 8 times the diameter of the screw of the extruder,
a second section having a length in the range from 4 to 8 times the diameter of the screw of the extruder, and
a third section having a length in the range from 16 to 36 times the diameter of the screw of the extruder.

Most preferably, the reaction zone of the extruder comprises
a first section having a length in the range from 4 to 8 times the diameter of the screw of the extruder,
a second section having a length in the range from 4 to 8 times the diameter of the screw of the extruder, and
a third section having a length in the range from 20 to 28 times the diameter of the screw of the extruder.

As described above, it is preferred that the extruder is divided into barrel elements which have a length of four times the diameter of the screw of the extruder. Therefore, the reaction zone usually comprises
a first section having a length in the range from 1 to 3 barrel elements,
a second section having a length in the range from 1 to 3 barrel elements, and
a third section having a length in the range from 3 to 11 barrel elements.

More preferably the reaction zone of the extruder comprises
a first section having a length in the range from 1 to 2 barrel elements,
a second section having a length in the range from 1 to 2 barrel elements, and
a third section having a length in the range from 4 to 9 barrel elements.

Most preferably, the reaction zone of the extruder comprises
a first section having a length in the range from 1 to 2 barrel elements,
a second section having a length in the range from 1 to 2 barrel elements, and
a third section having a length in the range from 5 to 7 barrel elements.

The first section of the reaction zone differs from the second section of the reaction zone in the components comprised therein.

The first section of the reaction zone usually comprises at least one of the components (A), (B) and (C), preferably the first section comprises component (A), component (B) and component (C). Preferably, the first section of the reaction zone does not comprise the at least one carbon material. The second section of the reaction zone comprises components (A), (B) and (C) and additionally the at least one carbon material.

Moreover, the first section of the reaction zone differs from the second section and the third section of the reaction zone in its temperature. The temperature ($T_1$) of the first section of the reaction zone is preferably below the temperature ($T_2$) of the second section and the temperature ($T_3$) of the third section of the reaction zone.

For example, the temperature ($T_1$) of the first section of the reaction zone is in the range from 20 to 350° C., preferably in the range from 80 to 250° C., and more preferably in the range from 100 to 200° C.

The temperature ($T_2$) of the second section of the reaction zone is usually in the range from 100 to 350° C., preferably in the range from 180 to 300° C., and particularly preferably in the range from 230 to 280° C.

The temperature ($T_3$) of the third section of the reaction zone is for example in the range from 100 to 250° C., preferably in the range from 180 to 300° C., and particularly preferable in the range from 230 to 280° C.

As described above, the temperature ($T_1$) of the first section, the temperature ($T_2$) of the second section and the temperature ($T_3$) of the third section of the reaction zone of the extruder refer to the jacket temperature of each section.

The third section of the reaction zone preferably differs from the first section of the reaction zone and the second section of the reaction zone in the elements comprised within the third section.

The expression "elements comprised" means by way of example conveying elements, flow restricting elements, mixing elements and kneading elements. Suitable conveying elements, flow restricting elements, mixing elements and kneading elements which can be comprised in the extruder are known to the person skilled in the art.

Conveying elements serve for the onward transport of the components comprised within the extruder. The shear rate acting on the components in the extruder via the conveying elements is smaller than the shear rate acting on the components in the extruder via mixing elements or kneading elements. Suitable conveying elements are known to the person skilled in the art and are, by way of example, screw conveying elements.

Mixing elements serve for the mixing of the individual components comprised in the extruder. The shear rate acting on the components in the extruder via the mixing elements is usually smaller than the shear rate acting on the components via kneading elements. Suitable mixing elements are known to the skilled person and are, by way of example, tooth mixing elements or screw mixing elements.

Kneading elements likewise serve for the mixing of the individual components comprised in the extruder. The shear rate acting on the components in the extruder via the kneading elements is usually higher than the shear rate acting on the components via mixing elements and via conveying elements. Suitable kneading elements are known to the person skilled in the art and are, by way of example, kneading screws or kneading blocks, for example disk kneading blocks or shoulder kneading blocks.

Flow restricting elements are unlike conveying elements in having reverse conveying effects and, thus, restrict the flow of the components comprised in the extruder. Flow restricting elements usually used are conveying elements, mounted in such way that their direction of conveying is opposite to the direction of transport in the extruder.

The first section and the second section of the reaction zone preferably comprise exclusively conveying elements.

The third section of the reaction zone of the extruder preferably comprises conveying elements as well as mixing elements and kneading elements. Particularly preferably, conveying elements, mixing elements and kneading elements alternate in the third section of the reaction zone of the extruder.

Moreover, it is preferred that at least one of the first section, the second section and the third section of the reaction zone does not comprise flow restricting elements. More preferably the first section, the second section and the third section of the reaction zone do not comprise flow restricting elements. Therefore, most preferably, the reaction zone does not comprise flow restricting elements.

The extruder preferably comprises at least one hopper in the first section of the reaction zone to add the first mixture (M1), the second mixture (M2) and the third mixture (M3) into the extruder. For example, the first section of the reaction zone of the extruder comprises in the range from 1 to 3, more preferably in the range from 1 to 2, and particularly preferably one hopper.

Moreover, the second section of the extruder preferably comprises a feed for the at least one carbon material. Any feed known to the skilled person can be used, for example a hopper or a side feeding unit using one or two feeding screws.

The extruder furthermore comprises a devolatilization zone.

In the devolatilization zone, volatile components comprised in the reinforced raw polyamide (rrP) are removed.

The devolatilization zone preferably is separated from the reaction zone by at least one kneading element and/or at least one flow restricting element, preferably by at least one flow restricting element.

The devolatilization zone can have any length. The devolatilization zone preferably has a length in the range from 12 to 60 times the diameter of the screw of the extruder, preferably in the range from 20 to 48 times the diameter of the screw of the extruder and particularly preferably in the range from 24 to 40 times the diameter of the screw of the extruder.

Therefore, the present invention also provides a process wherein the extruder comprises a screw and wherein the length of the devolatilization zone is in the range from 12 to 60 times the diameter of the screw of the extruder.

Preferably, the extruder is divided into barrel elements having a length of four times the diameter of the screw of the extruder. The devolatilization zone then usually comprises in the range from 3 to 15 barrel elements, preferably in the range from 5 to 12 barrel elements, and particularly preferably in the range from 6 to 10 barrel elements.

Within the context of the devolatilization zone, the barrel elements are also called "zones". Therefore, the devolatilization zone preferably comprises in the range from 3 to 15, preferably in the range from 5 to 12 and particularly preferably in the range from 6 to 10 zones.

Another object of the present invention is therefore also a process wherein the devolatilization zone comprises in the range from 3 to 15 zones.

The devolatilization zone differs from the reaction zone usually in the temperature. The temperature in the devolatilization zone is usually lower than the temperature in the second section and in the third section of the reaction zone. For example, the temperature in the devolatilization zone is in the range from 100 to 350° C., preferably in the range from 180 to 300° C., and particularly preferably in the range from 220 to 280° C.

Moreover, the devolatilization zone can differ from the reaction zone in the components comprised as well as in the elements comprised.

The zones of the devolatilization zone are usually selected from the group consisting of pressure build-up zones and stress relief zones. Preferably, the devolatilization zone comprises pressure build-up zones and stress relief zones. More preferably, pressure build-up zones and stress relief zones alternate in the devolatilization zone.

Pressure build-up zones and stress relief zones usually differ in the elements comprised. Moreover, pressure build-up zones and stress relief zones can differ from each other in the components comprised and, optionally, in their temperature.

Pressure build-up zones usually comprise flow restricting elements, whereas stress relief zones usually comprise conveying elements.

Another object of the present invention is therefore also a process wherein the devolatilization zone comprises alternating pressure build-up zones and stress relief zones wherein the pressure build-up zones comprise flow restricting elements, and the stress relief zones comprise conveying elements.

The pressure build-up zones preferably moreover comprise at least one feed to add a stripping fluid. Suitable stripping fluids are known to the skilled person and are, for example, selected from the group consisting of water, nitrogen, carbon dioxide, n-heptane, n-decane, dibutyl ether, 1-Methoxy-2-(2-methoxyethoxy)ethane, n-heptanol, and Methylglyoxal 1,1-dimethyl acetal.

Another object of the present invention is therefore also a method, wherein a stripping fluid is added into the pressure build-up zones of the devolatilization zone of the extruder.

The throughput of the stripping fluid is usually in the range from 0.1 to 1.5 kg/h, preferably in the range from 0.5 to 1.2 kg/h and particularly preferably in the range from 0.75 to 1.0 kg/h.

The stress relief zone usually comprises at least one vacuum port so that volatile components comprised in the extruder can be removed together with the stripping fluid under vacuum pressure.

Another object of the present invention is therefore also a method wherein in the stress relief zones of the devolatilization zone vacuum is drawn to remove volatile components and the stripping fluid from the extruder.

Suitable vacuum pumps to draw vacuum within the stress relief zones are known to the skilled person and are preferably selected from the group consisting of water ring pumps, dry claw vacuum pumps and oil-lubricated rotary vane vacuum pumps.

The absolute vacuum pressure in the stress relief zones is usually in the range from 0.01 to 250 mbar, preferably in the range from 0.1 to 150 mbar and more preferably in the range from 1 to 100 mbar.

Step a)

In step a), a first mixture (M1) comprising component (A), at least one lactam, is provided.

The expressions "component (A)" and "at least one lactam" are used as synonyms for the purpose of the present invention and, therefore, have the same meaning.

Component (A) will be described in more detail below.

The first mixture (M1) can additionally comprise component (A1), at least one monomer, selected from the group consisting of lactones, lactides, and alkylene oxides.

Another object of the present invention is therefore also a process wherein the first mixture (M1) additionally comprises component (A1) at least one monomer selected from the group consisting of lactones, lactides and alkylene oxides.

Suitable lactones are known to the skilled person. Preferably, the lactone is caprolactone.

Suitable lactides are as well known to the skilled person. Preferably, the lactides are selected from the group consisting of (S,S)-lactide, (R,R)-lactide, and (meso)-lactide.

Suitable alkylene oxides are known to the person skilled in the art. Preferably, suitable alkylene oxides are selected from the group consisting of ethylene oxide and propylene oxide.

For example, the first mixture (M1) comprises in the range from 20 to 100% by weight of component (A), and in the range from 0 to 80% by weight of component (A1), based in each case on the sum of the percentages by weight of components (A) and (A1), preferably based on a total weight of the first mixture (M1).

Preferably the first mixture (M1) comprises from 30 to 99.99% by weight of component (A), and from 0.01 to 65% by weight of component (A1), based in each case on the sum of the percentages by weight of components (A) and (A1), preferably based on the total weight of the first mixture (M1).

Most preferably, the first mixture (M1) comprises from 40 to 99.9% by weight of component (A), and from 0.1 to 60% by weight of component (A1), based in each case on the sum of the percentages by weight of components (A) and (A1), preferably based on the total weight of the first mixture (M1).

If the first mixture (M1) comprises component (A1); then the percentages by weight of components (A) and (A1) usually add up to 100% by weight.

In one embodiment, the first mixture (M1) does not comprise component (A1), at least one monomer selected from the group consisting of lactones, lactides and alkylene oxides.

The first mixture (M1) can furthermore comprise at least one of component (B), at least one catalyst, and component (C), at least one activator.

Preferably, the first mixture (M1) does not comprise component (B), at least one catalyst.

It is furthermore preferred that the first mixture (M1) does not comprise component (C), at least one activator.

It is also preferred that the first mixture (M1) does not comprise at least one carbon material.

Therefore, in one embodiment, it is preferred that the first mixture (M1) consists of component (A).

The first mixture (M1) can be provided by any method known to the skilled person. For example, the first mixture (M1) can be provided in solid state or in molten state. Preferably, the first mixture (M1) is provided in molten state.

If the first mixture (M1) is provided in solid state, the first mixture (M1) can be provided as granulate or as powder, for example.

Preferably, the first mixture (M1) is provided in molten state. "Molten state" within the context of the present invention means that the first mixture (M1) is provided at a temperature which is above the melting temperature ($T_{M1}$) of the first mixture (M1). "In molten state" therefore means that the first mixture (M1) has a temperature that is above the melting temperature ($T_{M1}$) of the first mixture (M1). If the first mixture (M1) is in a molten state, this means that the first mixture (M1) is flowable.

"Flowable" means that the first mixture (M1) can be conveyed in the extruder.

The melting temperature ($T_{M1}$) of the first mixture (M1) is preferably in the range from to 170° C. and more preferably in the range from 50 to 155° C. measured by differential scanning calorimetry (DSC).

Component (A)

Component (A) in the invention is at least one lactam.

For the purpose of the present invention, "at least one lactam" means either precisely one lactam or else a mixture of two or more lactams.

"Lactam" in the invention means cyclic amides having from 4 to 12 carbon atoms in the ring, preferably from 6 to 12 carbon atoms.

The present invention therefore also provides a process in which component (A) is at least one lactam having 4 to 12 carbon atoms.

Examples of suitable lactams are selected from the group consisting of 4-aminobutanolactam (γ-lactam; γ-butyrolactam; pyrrolidone), 5-aminopentanolactam (δ-lactam; δ-valerolactam; piperidone), 6-aminohexanolactam (ε-lactam; ε-caprolactam), 7-aminoheptanolactam (ζ-lactam; ζ-heptanolactam; enantholactam), 8-amino-octanolactam (η-lactam; η-octanolactam; caprylolactam), 9-nonanolactam (θ-lactam; θ-popanolactam) 10-decanolactam (ω-decanolactam; capric lactam), 11-undecanolactam (ω-undecanolactam), and 12-dodecanolactam (ω-dodecanolactam; laurolactam).

The present invention therefore also provides a process in which component (A) is selected from the group consisting of pyrrolidone, piperidone, ε-caprolactam, enantholactam, caprylolactam, capric lactam and laurolactam.

The lactams can be unsubstituted or can be at least monosubstituted. If at least monosubstituted lactams are used, these can bear, at the ring carbon atoms, one, two, or more substituents selected mutually independently from the group consisting of $C_1$- to $C_{10}$-alkyl, $C_5$- to $C_6$-cycloalkyl, and $C_5$- to $C_{10}$-aryl.

It is preferable that component (A) is unsubstituted.

Examples of suitable $C_1$- to $C_{10}$-alkyl substituents are methyl, ethyl, propyl, isopropyl, n-butyl, sec-butyl, and tert-butyl. An example of a suitable $C_5$- to $C_6$-cycloalkyl substituent is cyclohexyl. Preferred $C_5$- to $C_{10}$-aryl substituents are phenyl and anthranyl.

It is particularly preferable to use unsubstituted lactams, preference being given here to 12-dodecanolactam (ω-dodecanolactam) and ε-lactam (ε-caprolactam). Most preference is given to ε-lactam (ε-caprolactam).

ε-Caprolactam is the cyclic amide of caproic acid. It is also called 6-aminohexanolactam, 6-hexanolactam or caprolactam. Its IUPAC name is "Acepan-2-one". The CAS number of caprolactam is 105-60-2, and its molecular formula is $C_6H_{11}NO$. Processes for the production of caprolactam are known to the person skilled in the art.

Step b)

In step b), a second mixture (M2) comprising component (B), at least one catalyst, is provided.

The terms "component (B)" and "at least one catalyst" are used as synonyms in the present invention and, therefore, have the same meaning.

Component (B), comprised in the second mixture (M2), will be described in more detail below.

The second mixture (M2) can furthermore comprise component (A), at least one lactam. This embodiment is preferred.

For component (A), at last one lactam, optionally comprised in the second mixture (M2) the embodiments and preferences as described above for component (A) comprised in the first mixture (M1) hold true.

Component (A), optionally comprised in the second mixture (M2), can be the same or different from component (A), comprised in the first mixture (M1). Preferably, component (A), optionally comprised in the second mixture (M2), is the same as component (A), comprised in the first mixture (M1).

If the second mixture (M2) comprises additionally component (A), then the second mixture (M2), for example, comprises from 0 to 99.5% by weight of component (A) and from 0.5 to 100% by weight of component (B), based in each case on the sum of the percentage by weight of components (A) and (B), preferably based on the total weight of the second mixture (M2).

Preferably, the second mixture (M2) then comprises in the range from 10 to 99.5% by weight of component (A) and from 0.5 to 90% by weight of component (B), based in each case on the sum of the percentage by weight of components (A) and (B), preferably based on the total weight of the second mixture (M2).

Particularly preferably, the second mixture (M2) comprises from 20 to 99% by weight of component (A) and from 1 to 80% by weight of component (B), based in each case on the sum of the percentage by weight of components (A) and (B), preferably based on the total weight of the second mixture (M2).

If the second mixture (M2) comprises additionally component (A), then the percentages by weight of components (A) and (B) comprised in the second mixture (M2) usually add up to 100% by weight.

The second mixture (M2) can furthermore comprise component (A1), at least one monomer selected from the group consisting of lactones, lactides and alkylene oxides.

For component (A1), optionally comprised in the second mixture (M2) the embodiments and preferences as described above for component (A1), optionally comprised in the first mixture (M1), hold true.

Preferably, the second mixture (M2) does not comprise component (A1), at least one monomer selected from the group consisting of lactones, lactides, and alkylene oxide.

The second mixture (M2), preferably, does not comprise a component (C), at least one activator.

Moreover, the second mixture (M2) preferably does not comprise at least one carbon material.

The second mixture (M2) can be provided in step b) by any method known to the skilled person. For example, the second mixture (M2) can be provided in solid state or in molten state. Preferably, the second mixture (M2) is provided in molten state.

If the second mixture (M2) is provided in solid state, the second mixture (M2) can be provided as granulate or as powder, for example.

Preferably, the second mixture (M2) is provided in molten state. "Molten state" within the context of the present invention means that the second mixture (M2) is provided at a temperature which is above the melting temperature ($T_{M2}$) of the second mixture (M2). "In molten state" therefore means that the second mixture (M2) has a temperature that is above the melting temperature ($T_{M2}$) of the second mixture (M2). If the second mixture (M2) is in a molten state, this means that the second mixture (M2) is flowable. "Flowable" means that the second mixture (M2) can be conveyed in the extruder.

The melting temperature ($T_{M2}$) of the second mixture (M2) is preferably in the range from 20 to 170° C. and more preferably in the range from 50 to 155° C. measured by differential scanning calorimetry (DSC).

Component (B)

Component (B) in the invention is at least one catalyst.

For the purpose of the present invention, "at least one catalyst" means either precisely one catalyst or else a mixture of two or more catalysts.

The at least one catalyst is preferably a catalyst for the anionic polymerization of a lactam. The at least one catalyst therefore preferably allows the formation of lactam anions. The at least one catalyst is therefore capable of forming lactamates by removing the nitrogen-bonded proton of the at least one lactam (component (A)).

Lactam anions per se can equally function as the at least one catalyst. The at least one catalyst can also be called initiator.

Suitable components (B) are known per se to the person skilled in the art, and are described by way of example in "Polyamide. Kunststoff-Handbuch" [Polyamides. Plastics Handbook], Carl-Hanser-Verlag 1998.

It is preferable that component (B) is selected from the group consisting of alkali metal lactamates, alkaline earth metal lactamates, alkali metals, alkaline earth metals, alkali metal hydrides, alkali earth metal hydrides, alkali metal hydroxides, alkaline earth metal hydroxides, alkali metal alcoholates, alkaline earth metal alcoholates, alkali metal amides, alkaline earth metal amides, alkali metal oxides, alkaline earth metal oxides, and organometallic compounds.

The present invention therefore also provides a process in which component (B) is selected from the group consisting of alkali metal lactamates, alkaline earth metal lactamates, alkali metals, alkaline earth metals, alkali metal hydrides, alkaline earth metal hydrides, alkali metal hydroxides, alkaline earth metal hydroxides, alkali metal alcoholates, alkaline earth metal alcoholates, alkali metal amides, alkaline earth metal amides, alkali metal oxides, alkaline earth metal oxides, and organometallic compounds.

It is particularly preferable that component (B) is selected from alkali metal lactamates and alkaline earth metal lactamates.

Alkali metal lactamates are known per se to the person skilled in the art. Examples of suitable alkali metal lactamates are sodium caprolactamate and potassium caprolactamate.

Examples of suitable alkaline earth metal lactamates are magnesium bromide caprolactamate, magnesium chloride caprolactamate, and magnesium biscaprolactamate. Examples of suitable alkali metals are sodium and potassium, and examples of suitable alkaline earth metals are magnesium and calcium. Examples of suitable alkali metal hydrides are sodium hydride and potassium hydride, and suitable alkali metal hydroxides are sodium hydroxide and potassium hydroxide. Examples of suitable alkali metal alcoholates are sodium methanolate, sodium ethanolate, sodium propanolate, sodium butanolate, potassium methanolate, potassium ethanolate, potassium propanolate, and potassium butanolate.

In another embodiment that is in particular preferred, component (B) is selected from the group consisting of sodium hydride, sodium, sodium caprolactamate, and a solution of sodium caprolactamate in caprolactam. Particular preference is given to sodium caprolactamate and/or a solution of sodium caprolactamate in caprolactam (for example Brüggolen 010, from 17 to 19% by weight of sodium caprolactamate and caprolactam). The at least one catalyst can be used in the form of solid or in solution. It is preferable that the at least one catalyst is used in the form of solid. It is in particular preferable that the catalyst is added to a caprolactam melt in which it can be dissolved to provide the second mixture (M2).

It is clear to the person skilled in the art that if component (B) is by way of example an alkali metal this reacts on contact with the at least one lactam (component (A)) and thus forms an alkali metal lactamate.

Step c)

In step c), a third mixture (M3), comprising component (C), at least one activator, is provided.

The expressions "component (C)" and "at least one activator" are used as synonyms for the purpose of the present invention and therefore have the same meaning. Component (C) which is comprised in the third mixture (M3) will be described in more detail below.

The third mixture (M3) can furthermore comprise component (A), at least one lactam.

For component (A), at last one lactam, comprised in the third mixture (M3) the embodiments and preferences as described above for component (A) comprised in the first mixture (M1) hold true.

Component (A), optionally comprised in the third mixture (M3), can be the same or different from component (A), comprised in the first mixture (M1). Preferably, component (A), optionally comprised in the third mixture (M3), is the same as component (A), comprised in the first mixture (M1).

If the third mixture (M3) comprises additionally component (A), then the third mixture (M3), for example, comprises from 0 to 90% by weight of component (A) and from 10 to 100% by weight of component (C), based in each case on the sum of the percentage by weight of components (A) and (C), preferably based on the total weight of the third mixture (M3).

Preferably, the third mixture (M3) then comprises in the range from 0.01 to 50% by weight of component (A) and from 50 to 99.99% by weight of component (C), based in each case on the sum of the percentage by weight of components (A) and (C), preferably based on the total weight of the third mixture (M3).

Particularly preferably, the third mixture (M3) comprises from 0.1 to 20% by weight of component (A) and from 80 to 99.9% by weight of component (C), based in each case on the sum of the percentage by weight of components (A) and (C), preferably based on the total weight of the third mixture (M3).

If the third mixture (M3) additionally comprises component (A), then the percentages by weight of components (A) and (C) usually add up to 100% by weight.

In one preferred embodiment of the present invention, the third mixture (M3) does not comprise component (A), at least one lactam.

The third mixture (M3) can furthermore comprise component (A1), at least one monomer selected from the group consisting of lactones, lactides, and alkylene oxides.

For component (A1), optionally comprised in the third mixture (M3) the embodiments and preferences as described above for component (A1), optionally comprised in the first mixture (M1), hold true.

Preferably, the third mixture (M3) does not comprise component (A1), at least one monomer selected from the group consisting of lactones, lactides, and alkylene oxides.

The third mixture (M3), preferably, does not comprise component (B), at least one catalyst.

Moreover, the third mixture (M3) preferably does not comprise at least one carbon material.

The third mixture (M3) can be provided in step c) by any method known to the skilled person. For example, the third mixture (M3) can be provided in solid state or in molten state. Preferably, the third mixture (M3) is provided in molten state.

If the third mixture (M3) is provided in solid state, the third mixture (M3) can be provided as granulate or as powder, for example.

Preferably, the third mixture (M3) is provided in molten state. "Molten state" within the context of the present invention means that the third mixture (M3) is provided at a temperature which is above the melting temperature ($T_{M3}$) of the third mixture (M3). "In molten state" therefore means that the third mixture (M3) has a temperature that is above the melting temperature ($T_{M3}$) of the third mixture (M3). If the third mixture (M3) is in a molten state, this means that the third mixture (M3) is flowable.

"Flowable" means that the third mixture (M3) can be conveyed in the extruder.

The melting temperature ($T_{M3}$) of the third mixture (M3) is preferably in the range from 0 to 120° C. and more preferably in the range from 15 to 100° C. measured by differential scanning calorimetry (DSC).

Component (C)

Component (C) according to the present invention is at least one activator.

For the purpose of the present invention, "at least one activator" means either precisely one activator or else a mixture of two or more activators.

Any activator known to the person skilled in the art that is suitable for activating the anionic polymerization of the at least one lactam (component (A)) is suitable as the at least one activator. It is preferable that the at least one activator is selected from the group consisting of N-substituted lactams, diisocyanates, polyisocyanates, allophanates, and diacyl halides; it is particularly preferable that the at least one activator is selected from the group consisting of N-substituted lactams.

The present invention therefore also provides a process in which component (C) is selected from N-substituted lactams, diisocyanates, polyisocyanates, allophanates, and diacyl halides.

It is preferable that the N-substituted lactams have electrophilic N-substitution. Examples of suitable lactams having electrophilic N-substitution are acyllactams, for example N-acetylcaprolactam, and precursors of these which, together with the at least one lactam (component (A)), form an activated lactam in situ. An example of another suitable N-substituted lactam is a capped diisocyanate.

Diisocyanates that can be used are not only aliphatic diisocyanates but also aromatic diisocyanates. Among the aliphatic diisocyanates are by way of example butylene diisocyanate, hexamethylene diisocyanate, octamethylene diisocyanate, decamethylene diisocyanate, undecamethylene diisocyanate, dodecamethylene diisocyanate, 4,4'-methylenebis(cyclohexyl isocyanate), and isophorone diisocyanate. Examples of aromatic diisocyanates are tolyl diisocyanate and 4,4'-methylenebis(phenyl) isocyanate. Examples of polyisocyanates are isocyanates derived from hexamethylene diisocyanate (Basonat HI 100/BASF SE). Examples of suitable allophanates are ethyl allophanates.

Suitable diacyl halides are not only aliphatic diacyl halides but also aromatic diacyl halides. Suitable aliphatic diacyl halides are compounds such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, 4,4'-methylenebis(cyclohexyloyl chloride), 4,4'-methylenebis(cyclohexyloyl bromide), isophoronedioyl chloride, and isophoronedioyl bromide; suitable aromatic diacyl halides are compounds such as tolylmethylenedioyl chloride, tolylmethylenedioyl chloride, 4,4'-methylenebis(phenyloyl chloride), 4,4'-methylenebis(phenyloyl bromide).

In a preferred embodiment, component (C) is selected from the group consisting of hexamethylene diisocyanate, isophorone diisocyanate, hexamethylenedioyl bromide, hexamethylenedioyl chloride, and mixtures of these; it is particularly preferable to use hexamethylene diisocyanate.

The at least one activator can be used in solution. In particular, the at least one activator can be dissolved in caprolactam.

An example of another product suitable as at least one activator is Brüggolen® C20, 80% caprolactam-blocked hexamethylene 1,6-diisocyanate in caprolactam from Brüggemann, DE.

Step d)

In step d), the first mixture (M1), the second mixture (M2) and the third mixture (M3) are added into the first section of the reaction zone of the extruder to obtain a polymerizable mixture (pM) in the extruder.

The first mixture (M1), the second mixture (M2) and the third mixture (M3) can be added into the first section of the reaction zone of the extruder by any method known to the skilled person. Preferably, the first mixture (M1), the second mixture (M2) and the third mixture (M3) are added in molten state through the at least one hopper into the first section of the reaction zone of the extruder.

In the first section of the reaction zone of the extruder, the first mixture (M1), the second mixture (M2) and the third mixture (M3) are mixed to obtain the polymerizable mixture (pM). The mixing of the first mixture (M1), the second mixture (M2) and the third mixture (M3) is also known as compounding of the first mixture (M1), the second mixture (M2) and the third mixture (M3).

The temperature ($T_d$) in the first section of the reaction zone of the extruder during step d) is, for example, in the range from 20 to 350° C., preferably in the range from 80 to 250° C. and particularly preferably in the range from 100 to 200° C.

Another object of the present invention is therefore also a method wherein the temperature ($T_d$) in the first section of the reaction zone of the extruder during step d) is in the range from 20 to 350° C.

The polymerizable mixture (pM) obtained in step d) usually comprises from 70 to 99.65% by weight of component (A), from 0.25 to 15% by weight of component (B) and from 0.1 to 15% by weight of component (C), in each case based on the sum of the percentages by weight of components (A), (B) and (C), preferably based on the total weight of the polymerizable mixture (pM).

Preferably the polymerizable mixture (pM) comprises from 80 to 99.25% by weight of component (A), from 0.5 to 10% by weight of component (B) and from 0.25 to 10% by weight of component (C), in each case based on the sum of the percentages by weight of components (A), (B) and (C), preferably based on the total weight of the polymerizable mixture (pM).

Particularly preferably, the polymerizable mixture (pM) comprises from 87.5 to 99.6% by weight of component (A), from 1 to 7.5% by weight of component (B) and from 0.5 to 5% by weight of component (C), in each case based on the sum of the percentages of the weight of components (A), (B) and (C), preferably based on the total weight of the polymerizable mixture (pM).

The sum of the percentages by weight of the components (A), (B) and (C) adds up in general to 100 wt.-%. It should be clear that if at least one of the mixtures provided in steps a), b) and c) comprised component (A1), the polymerizable mixture (pM) obtained in step d) as well comprises component (A1).

Unless indicated otherwise, all of the weight percent figures of components (A), (B) and (C) comprised in the polymerizable mixture (pM) are based on the composition of the polymerizable mixture (pM) at the beginning of the polymerization. The phrase "composition of the polymerizable mixture (pM) at the beginning of the polymerization" refers in the context of the present invention to the composition of the polymerizable mixture (pM) before the components (A), (B) and (C) present in the polymerizable mixture (pM) begin to react with one another, in other words, before the polymerization sets in. The components (A), (B) and (C) present in the polymerizable mixture (pM) are at that point therefore still in their unreacted form. It is self-evident that during the polymerization of the polymerizable mixture (pM) the components (A), (B) and (C) present in the polymerizable mixture (pM) react at least partly with one another and, therefore, the proportions of the components (A), (B) and (C) among one another change just as the components (A), (B) and (C) present in the polymerizable mixture (pM) change during the polymerization. The skilled person is aware of these reactions.

It is possible that in the first section of the reaction zone of the extruder, a reaction of the components comprised in the polymerizable mixture (pM) already sets in. In particular, the reaction of component (A) and optionally component (A1) can start as an anionic polymerization. This reaction is known to the person skilled in the art.

Without restriction thereto, it is assumed that during the reaction of the components comprised in the polymerizable mixture (pM) in particular oligomers form. Oligomers are known to the skilled person.

Within the context of the present invention, the term polymerizable mixture (pM) therefore does not only mean the mixture of the first mixture (M1), the second mixture (M2) and the third mixture (M3), comprising components (A), (B), (C) and optionally (A1) in their unreacted form but also a mixture comprising components (A), (B) and (C) in their at least partially reacted form.

Step e)

In step e), at least one carbon material is added to the second section of the reaction zone of the extruder to the polymerizable mixture (pM) obtained in step d) to obtain a carbon containing polymerizable mixture (cpM) in the extruder.

The at least one carbon material will be described in more detail below.

The at least one carbon material can be added by any method known to the skilled person. Preferably, the carbon material is added through a feed in the second section of the reaction zone of the extruder.

The temperature ($T_e$) in the third section of the reaction zone of the extruder during step e) is preferably in the range from 100 to 350° C., more preferably in the range from 180 to 350° C., and particularly preferably in the range from 230 to 280° C.

The at least one carbon material is mixed with the polymerizable mixture (pM) in the extruder to obtain the carbon containing polymerizable mixture (cpM). This mixing is also called compounding. It is assumed that the mixing of the at least one carbon material with the polymerizable mixture (pM) in particular takes place in the second section of the reaction zone of the extruder. However, the mixing can at least partially also take place in the third section of the reaction zone of the extruder.

The carbon containing polymerizable mixture (cpM) usually comprises the at least one carbon material dispersed in the polymerizable mixture (pM).

Therefore, the at least one carbon material comprised in the carbon containing polymerizable mixture (cpM) is the dispersed phase of the carbon containing polymerizable mixture (cpM) and the polymerizable mixture (pM) is the dispersion medium of the carbon containing polymerizable mixture (cpM).

For example, the carbon containing polymerizable mixture (cpM) comprises from 55 to 98.9% by weight of component (A), from 0.5 to 15% by weight of component (B), from 0.5 to 15% by weight of component (C) and from 0.01 to 15% by weight of the at least one carbon material, in each case based on the percentages by weight of components (A), (B) and (C) as well as the at least one carbon material, preferably based on the total weight of the carbon containing polymerizable mixture (cpM).

Preferably, the carbon containing polymerizable mixture (cpM) comprises from 80 to 98.3% by weight of component (A), from 0.8 to 5% by weight of component (B), from 0.8 to 5% by weight of component (C) and from 0.1 top 10% by weight of the at least one carbon material, in each case based on the sum of the percentages by weight of components (A), (B) and (C) as well as the at least one carbon material, preferably based on the total weight of the carbon containing polymerizable mixture (cpM).

Most preferably, the carbon containing polymerizable mixture (cpM) comprises from 88 to 96.5% by weight of component (A), from 2 to 4% by weight of component (B), from 1 to 3% by weight of component (C) and from 0.5 to 5% by weight of the at least one carbon material, in each case based on the sum of the percentages by weight of components (A), (B) and (C) as well as the at least one carbon material, preferably based on the total weight of the carbon containing polymerizable mixture (cpM).

As described above, the percentages by weight of components (A), (B) and (C) refer to the percentages by weight before these components have reacted with each other.

Carbon Material

For the purpose of the present invention, "at least one carbon material" means either precisely one carbon material or else a mixture of two or more carbon materials.

Any carbon material known to the skilled person can be used as the at least one carbon material. Preferably, the at least one carbon material is selected from the group consisting of graphite, carbon black, graphene, carbon nanotubes, fullerenes, carbon nanobuds, carbon peapods and carbon nanotori.

More preferably, the at least one carbon material is selected from the group consisting of graphite, graphene, carbon black and carbon nanotubes.

Another object of the present invention is therefore also a process wherein the at least one carbon material is selected from the group consisting of graphite, carbon black, graphene, carbon nanotubes, fullerenes, carbon nanobuds, carbon peapods and carbon nanotori.

Graphite is a form of carbon as described for example in A. F. Hollemann, E. Wiberg: "*Lehrbuch der anorganischen Chemie*" ("*Textbook of inorganic chemistry*") 91.-100. ed., p. 701-702. Graphite consists of planar carbon layers which are arranged one above the other.

Carbon black is obtained by incomplete combustion of heavy petroleum products and is a form a paracrystalline carbon that has a high surface area to volume ratio.

Carbon nanotubes are known to those skilled in the art. For the description of suitable carbon nanotubes (CNTs) reference may be made to DE-A 10243592, to EP-A 2049597 or to DE-A 10259498. For the purpose of the present invention, carbon nanotubes are carbon comprising macromolecules in which the carbon has (mainly) a graphite structure, and the individual graphite layers are arranged in the form of a tube. Nanotubes and their synthesis are already known in the literature (for example J. Hu et al.: *Acc. Chem. S.* 1999, 32, 435-445). For the purpose of the present invention, any type of nanotubes can be used. The diameter of the individual tubular graphite layers (graphite tubes) is preferably from 4 to 20 nm, in particular from 5 to 10 nm. Nanotubes can in principle be divided into single-walled nanotubes (SWNTs) and multi-walled nanotubes (MWNTs). In the MWNTs, a plurality of graphite tubes are therefore nested with one another. The aspect ratio (length of the respective graphite tube to the diameter thereof) is at least >5, preferably at least >10. The nanotubes have a length of at least 10 nm. For the purpose of the present invention, MWNTs are preferred.

Graphene is a monolayer of carbon atoms arranged in a two-dimensional honeycomb network. "Graphene" in the terms of the present invention is however not restricted to a material consisting exclusively of single-layer graphene (i.e. graphene in the proper sense and according to the IUPAC definition), but, like in many publications and as used by most commercial providers, rather denotes a graphenic bulk material, which is generally a mixture of a single-layer material, a bi-layer material and a material containing 3 to 10 layers and sometimes even up to 20 layers ("few layer graphene"). The ratio of the different materials (single, bi and multiple layers) depends on the production process and provider. In case of the present invention, the material termed "graphene" is characterized by the absence of the graphite peak in the XRD: The degree of exfoliation of the graphene material being related to the layer thickness can be monitored by XRD (X-ray diffraction). The presence of the reflection at 2 theta=25 to 30° (with Cu Kα radiation, X-ray wavelength=0.154 nm; the precise value is 26.3°, but often only a broad band instead of a sharp peak is obtained) originates from the layered structure and thus relates to the amount of native graphite. Preferably, the graphene of the invention does not reveal a graphite peak related to the stacking and thus unexfoliated material.

"Graphene" in terms of the present invention is further characterized by a low bulk density of preferably at most 0.2 g/cm$^3$, e.g. from 0.001 to 0.2 g/cm$^3$ or from 0.005 to 0.2 g/cm$^3$, more preferably at most 0.15 g/cm$^3$, e.g. from 0.001 to 0.15 g/cm$^3$ or from 0.005 to 0.15 g/cm$^3$, even more preferably at most 0.1 g/cm$^3$, e.g. from 0.001 to 0.1 g/cm$^3$ or from 0.005 to 0.1 g/cm³, in particular at most 0.05 g/cm³, e.g. from 0.001 to 0.05 g/cm³ or from 0.005 to 0.05 g/cm³, and specifically at most 0.01 g/cm³, e.g. from 0.001 to 0.01 g/cm³ or from 0.005 to 0.01 g/cm³.

"Graphene" in terms of the present invention is moreover characterized by a high BET (Brunauer-Emmett-Teller) surface area. Preferably, the BET area is at least 200 m²/g, e.g. from 200 to 2600 or from 200 to 2000 or from 200 to 1500 m²/g or from 200 to 700 m²/g; more preferably at least 300 m²/g, e.g. from 300 to 2600 or from 300 to 2000 or from 300 to 1500 or from 300 to 700 m²/g.

Suitable graphenes are for example described in *Macromolecules* 2010, 43, p. 6515-6530.

Fullerenes are as well known to the skilled person and are molecules of carbon in the form of a hollow sphere or an ellipsoid.

Carbon nanobuds are a combination of carbon nanotubes and spheroidal fullerenes. In carbon nanobuds, fullerenes are covalently bonded on the outer side walls of a carbon nanotube.

Carbon peapods are as well known to the skilled person, and are spheroidal fullerenes that are encapsulated within a carbon nanotube.

Carbon nanotori are toroidal carbon nanotubes.

Step f)

In step f), the carbon containing polymerizable mixture (cpM) obtained in step e) is polymerized in the third section of the reaction zone of the extruder to obtain a reinforced raw polyamide (rrP).

During step f), the component (A) comprised in the carbon containing polymerizable mixture (cpM) polymerizes to give a polyamide. This reaction is known to the skilled person. If the carbon containing polymerizable mixture (cpM) furthermore comprises component (A1) then component (A1) as well polymerizes, and a copolymer of component (A) and component (A1) forms. This reaction is as well known to the skilled person.

The polymerization of component (A) is an anionic polymerization reaction.

The temperature ($T_f$) in the third section of the reaction zone of the extruder during step f) is preferably in the range from 100 to 350° C., more preferably in the range from 180 to 350° C., and particularly preferably in the range from 230 to 280° C.

Another object of the present invention is therefore also a process wherein the temperature ($T_f$) in the third section of the reaction zone of the extruder during step f) is in the range from 100 to 350° C.

The residence time, of component (A) in the reaction zone is preferably in the range from 30 to 120 seconds (s).

Step g)

In step g), the reinforced raw polyamide (rrP) obtained in step f) is devolatilized in the devolatilization zone of the extruder to obtain the reinforced polyamide (rP).

The devolatilization of the reinforced raw polyamide (rrP) is known to the skilled person.

Usually, during the devolatilization first, a stripping fluid is added to the reinforced raw polyamide (rrP) and then, subsequently, vacuum is drawn so that the stripping fluid is removed together with other volatile components comprised in the reinforced raw polyamide (rrP).

Usually in the pressure build-up zone of the devolatilization zone of the extruder, the stripping fluid is added to the reinforced raw polyamide (rrP). In the stress relief zone, the stripping fluid and volatile components comprised in the reinforced raw polyamide (rrP) such as component (A) are removed. These steps are preferably repeated for several times, for example, two to eight times, preferably two to six times, and particularly preferably three to five times.

The temperature ($T_g$) of the devolatilization zone of the extruder in step g) usually is in the range from 100 to 350° C., preferably in the range from 180 to 300° C. and more preferably in the range from 220 to 280° C.

The temperature ($T_g$) of the devolatilization zone of the extruder in step G) is preferably above the melting temperature ($T_M$) of the reinforced polyamide (rP) obtained by the inventive process.

The pressure in the pressure build-up zones of the devolatilization zone of the extruder during step g) usually is in the range from 1 to 50 bar, preferably in the range from 1 to bar and more preferably in the range from 1 to 25 bar.

The pressure in the stress relief zones of the devolatilization zone of the extruder during step g) usually is in the range from 0.01 to 250 mbara, preferably in the range from 0.1 to 150 mbara and more preferably in the range from 1 to 100 mbara.

The reinforced polyamide (rP) can then be obtained from the extruder by any method known to the skilled person.

For example, to obtain the reinforced polyamide (rP), the reinforced polyamide (rP) can be extruded as a strand, quenched in a water bath and then be pelletized. It is also possible to under-water-pelletize or under-air-pelletize the obtained strand. These methods are known to the skilled person.

The obtained reinforced polyamide (rP) exhibits a significant low monomer content, a high E-modulus and a high elongation at break. Moreover, it exhibits a high tensile strength and a high Charpy-notched index as well as a homogeneous distribution of the at least one carbon material.

Another object of the present invention is therefore also a reinforced polyamide (rP) obtainable by the inventive process.

The obtained reinforced polyamide (rP) can be used for the production of moldings, for example by injection molding.

Another object of the present invention is therefore also a molding made of the reinforced polyamide (rP) according to the present invention.

The present invention is explained in more detail below by examples, but is not restricted thereto.

EXAMPLES

Example 1

A corotating intermeshing twin-screw extruder (ZSK 26 MC Coperion) consisting of a reaction zone and a devolatilization zone wherein the reaction zone consists of eight barrel elements, and the devolatilization zone consists of seven barrel elements is used. Each barrel element has a length of four times the screw diameter. The screw diameter is 26 mm.

The temperature of the first barrel element of the reaction zone is 170° C., the temperature of the second to eighth barrel element of the reaction zone is 260° C., the temperature of all barrel elements of the devolatilization zone is 220° C.

The first, the third and the fifth barrel element of the devolatilization zone are pressure built up zones. The first barrel element of the devloatilization zone has a water throughput of 750 g/h, the third barrel element of the devolatilization zone has a water throughput of 750 g/h and the fifth barrel element of the devolatilization zone has a water throughput of 375 g/h. The second, the fourth and the sixth barrel element of the devolatilization zone are stress relief zones. The second barrel element of the devolatilization zone has a pressure of 55 mbara, the fourth barrel element of the devolatilization zone has a pressure of 47 mbara and the sixth barrel element of the devolatilization zone has a pressure of 33 mbara. The seventh barrel element of the devolatilization zone is a pressure built-up zone wherein no water is used so that the obtained reinforced polyamide (rP) can be extruded therefrom.

A first mixture (M1) consisting of molten caprolactam and a second mixture (M2) consisting of molten caprolactam and magnesium bromide caprolactam (Brüggemann K G, Heilbronn) are added in the main hopper of the extruder and, subsequently, a third mixture (M3) consisting of caprolactam blocked HDI oligomer in N-acetylhexanelactam (RheinChemie Additives, Mannheim) is added to obtain a polymerizable mixture (pM) in the extruder. The main hopper is situated in the first section of the reaction zone of the extruder. A carbon material (CNS PC PEG Encapsulated Flake by Applied NanoStructured Solutions, LLC|A Lockheed Martin Company) is added in the second barrel element to obtain the carbon containing polymerizable mixture (cpM) in the extruder.

The obtained carbon containing polymerizable mixture (cpM) comprises 94% by weight of caprolactam, 3% by weight of magnesium bromide caprolactam, 1% by weight of caprolactam blocked HDI oligomer in N-acetylhexanelactam and 2% by weight of the carbon material.

In the third to eighth barrel element of the reaction zone, the obtained carbon containing polymerizable mixture (cpM) is polymerized to obtain the reinforced raw polyamide (rrP) which then enters the devolatilization zone comprising pressure built-up zones which alternate with stress relief zones. In the pressure built-up zones water is added as stripping agent, and in the stress relieve zones vacuum is drawn at three vacuum ports with three water ring pumps.

The obtained reinforced polyamide (rP) comprises 2% by weight of the carbon material and is extruded as strand and then quenched in a water bath and pelletized.

The obtained reinforced polyamide (rP) comprises 0.84 5 by weight of residual monomer (component (A), caprolactam), determined according to ISO 6427:2013.

The viscosity number of the obtained reinforced polyamide (rP) is 127.74 ml/g, determined according to ISO 307:2007.

Moldings were prepared from the obtained reinforced polyamide (rP) and characterized. All properties were tested for dry moldings as well as for moldings that were conditioned for 336 h (hours) at 70° C. with a relative humidity of 62%. The charpy notched impact strength was furthermore measured at −30° C. for dry moldings.

The tensile strength was measured according to ISO 527-2:2012.

The E-modulus was measured according to ISO 527-2:2012.

The elongation at break was measured according to ISO 527-2:2012.

The charpy notched impact strength was measured according to ISO179-2/1eA(F):1997+Amd.1:2011.

The work at break was measured according to ISO 527-2:2012.

The properties of the moldings prepared from the obtained reinforced polyamide (rP) are given in table 1.

Example 2

A corotating intermeshing twin-screw extruder (ZSK 26 MC Coperion) consisting of a reaction zone and a devolatilization zone wherein the reaction zone consists of eight barrel elements, and the devolatilization zone consists of seven barrel elements is used. Each barrel element has a length of four times the screw diameter. The screw diameter is 26 mm.

The temperature of the first barrel element of the reaction zone is 170° C., the temperature of the second to eighth barrel element of the reaction zone is 260° C., the temperature in all barrel elements of the devolatilization zone is 220° C.

The first, the third and the fifth barrel element of the deovlatilization zone are pressure built up zones. The first barrel element of the devolatilization zone has a water throughput of 750 g/h, the third barrel element of the devolatilization zone has a water throughput of 750 g/h and the fifth barrel element of the devolatilization zone has a water throughput of 375 g/h. The second, the fourth and the sixth barrel element of the devolatilization zone are stress relief zones. The second barrel element of the devolatilization zone has a pressure of 70 mbara, the fourth barrel element of the devolatilization zone has a pressure of 50 mbara and the sixth barrel element of the devolatilization zone has a pressure of 40 mbara.

A first mixture (M1) consisting of molten caprolactam and a second mixture (M2) consisting of molten caprolactam and magnesium bromide caprolactam (Brüggemann K G, Heilbronn) are added in the main hopper of the extruder and, subsequently, a third mixture (M3) consisting of caprolactam blocked HDI oligomer in N-acetylhexanelactam (RheinChemie Additives, Mannheim) is added to obtain a polymerizable mixture (pM) in the extruder. The main hopper is situated in the first section of the reaction zone of the extruder. A carbon material (CNS PC PEG Encapsulated Flake by Applied NanoStructured Solutions, LLC|A Lockheed Martin Company) is added in the second barrel element to obtain the carbon containing polymerizable mixture (cpM) in the extruder.

The obtained carbon containing polymerizable mixture (cpM) comprises 93% by weight of caprolactam, 3% by weight of magnesium bromide caprolactam, 1% by weight of caprolactam blocked HDI oligomer in N-acetylhexanelactam and 3% by weight of the carbon material.

In the third to eighth barrel element of the reaction zone, the obtained carbon containing polymerizable mixture (cpM) is polymerized to obtain the reinforced raw polyamide (rrP) which then enters the devolatilization zone comprising pressure built-up zones which alternate with stress relief zones. In the pressure built-up zones water is added as stripping agent, and in the stress relieve zones vacuum is drawn at three vacuum ports with three water ring pumps. The obtained reinforced polyamide (rP) comprises 3% by weight of the carbon material and is extruded as strand and then quenched in a water bath and pelletized.

Moldings prepared from the obtained reinforced polyamide (rP) were characterized as described above in example 1 and the properties are as well listed in table 1.

Comparative Example C3

For comparative example C3 Polyamide 6 was melt compounded with 3% by weight of a carbon material, based on the sum of the percentages by weight of Polyamide 6 (Ultramid B27 by BASF SE) and the carbon material (CNS PC PEG Encapsulated Flake by Applied NanoStructured Solutions, LLC|A Lockheed Martin Company), in an extruder (ZSK 26 MC Coperion) to obtain a melt-blended polyamide.

Moldings prepared from the obtained melt-blended polyamide were characterized as described above in example 1 and the properties are as well listed in table 1.

Comparative Example C4

As comparative example C4 a neat polyamide 6 (Ultramid B27 by BASF SE) was used.

Moldings prepared from the neat polyamide 6 were characterized as described above in example 1 and the properties are as well listed in table 1.

TABLE 1

|  | state | 1 | 2 | C3 | C4 |
|---|---|---|---|---|---|
| Tensile strength [MPa] | dry | 104.8 ± 2.2 | 98.5 ± 1.7 | 114.4 ± 0.1 | 78.5 ± 0.3 |
|  | conditioned | 69.9 ± 0.1 | 77.3 ± 0.4 |  | 75.2 ± 7.9 |
| E-Modulus [MPa] | dry | 4929 ± 25 | 4828 ± 25 | 4708 ± 16 | 2788 ± 24 |
|  | conditioned | 2244 ± 19 | 2572 ± 24 |  | 774 ± 3 |
| Elongation at break [%] | dry | 3.03 ± 0.22 | 28.76 ± 8.08 | 8.51 ± 1.35 | 49.66 ± 22.11 |
|  | conditioned | 103.85 ± 17.54 | 58.30 ± 5.14 |  | 358.67 ± 60.45 |
| Charpy notched impact strength [kJ/m$^2$] | dry | 6.99 ± 0.44 | 6.68 ± 0.55 | 5.58 ± 0.85 | 7.50 ± 0.27 |
|  | conditioned | 23.5 ± 1.0 | 15.9 ± 1.8 |  | 50.90 ± 3.30 |
|  | −30° C. | 6.40 ± 0.67 | 3.35 ± 0.54 |  | 7.91 ± 0.65 |
| Work at break [mJ/mm$^2$] | dry | 96 ± 11 | 1369 ± 1174 | 512.3 ± 217 | 1446 ± 550 |
|  | conditioned | 4232 ± 580 | 3091 ± 199 |  | 5982 ± 621 |

From the examples it can clearly be seen that moldings prepared from a reinforced polyamide (rP) obtained from the inventive process exhibit a significantly higher tensile strength and a higher E-modulus than moldings prepared from neat polyamide (comparative example C4).

Compared to moldings prepared from melt-blended polyamides (comparative example C3) moldings prepared from a reinforced polyamide (rP) obtained from the inventive process exhibit a higher E-modulus and a higher Charpy notched impact strength at the same content of carbon material (example 2) as well as at a lower content of carbon material (example 1). Furthermore at same content of carbon material the moldings prepared from the inventive reinforced polyamide (rP) exhibit a higher elongation at break than the moldings prepared from melt-blended polyamides.

Comparative Example C5

A corotating intermeshing twin-screw extruder (ZSK 26 MC Coperion) consisting of a reaction zone and a devolatilization zone wherein the reaction zone consists of eight barrel elements, and the devolatilization zone consists of seven barrel elements is used. Each barrel element has a length of four times the screw diameter. The screw diameter is 26 mm.

The temperature of the first barrel element of the reaction zone is 170° C., the temperature of the second to eighth barrel element of the reaction zone is 260° C., the temperature of all barrel elements of the devolatilization zone is 220° C.

The first, the third and the fifth barrel element of the devolatilization zone are pressure built up zones. In the pressure built-up zones no water is used for pressure built-up or as stripping agent. The second, the fourth and the sixth barrel element of the devolatilization zone are stress relief zones. The second barrel element of the devolatilization zone has a pressure of 55 mbara, the fourth barrel element of the devolatilization zone has a pressure of 47 mbara and the sixth barrel element of the devolatilization zone has a pressure of 33 mbara. The seventh barrel element of the devolatilization zone is a pressure built-up zone wherein no water is used so that the obtained reinforced polyamide (rP) can be extruded therefrom.

A first mixture (M1) consisting of molten caprolactam and a second mixture (M2) consisting of molten caprolactam and magnesium bromide caprolactam (Brüggemann K G, Heilbronn) are added in the main hopper of the extruder and, subsequently, a third mixture (M3) consisting of caprolactam blocked HDI oligomer in N-acetylhexanelactam (RheinChemie Additives, Mannheim) is added to obtain a polymerizable mixture (pM) in the extruder. The main hopper is situated in the first section of the reaction zone of the extruder. A carbon material (CNS PC PEG Encapsulated Flake by Applied NanoStructured Solutions, LLC|A Lockheed Martin Company) is added in the main hopper to obtain the carbon containing polymerizable mixture (cpM) in the extruder.

The obtained carbon containing polymerizable mixture (cpM) comprises 94% by weight of caprolactam, 3% by weight of magnesium bromide caprolactam, 1% by weight of caprolactam blocked HDI oligomer in N-acetylhexanelactam and 2% by weight of the carbon material.

In the second to eighth barrel element of the reaction zone, the obtained carbon containing polymerizable mixture (cpM) is polymerized to obtain the reinforced raw polyamide (rrP) which then enters the devolatilization zone comprising pressure built-up zones which alternate with stress relief zones. In the pressure built-up zones no water is added as stripping agent; in the stress relieve zones vacuum is drawn at three vacuum ports with three water ring pumps.

The obtained reinforced polyamide (rP) comprises 2% by weight of the carbon material and is extruded as strand and then quenched in a water bath and pelletized.

The residual monomer content (component (A); caprolactam) is 7.5% by weight and the viscosity number is 165 ml/g. The residual monomer content and the viscosity number are determined as described above.

By the inventive process a significantly lower residual monomer content and a significantly higher viscosity number than with processes described in the state of art is obtained. The higher viscosity number gives a hint on a higher molecular weight of the obtained reinforced polyamide (rP).

The invention claimed is:
1. A process for the production of a reinforced polyamide (rP) in an extruder, wherein the extruder comprises a reaction zone and a devolatilization zone, wherein the reaction zone comprises a first section, a second section, and a third section, comprising:
a) providing a first mixture (M1) comprising component (A) at least one lactam, b) providing a second mixture (M2) comprising component
  (B) at least one catalyst,
c) providing a third mixture (M3) comprising component (C) at least one activator,
d) adding the first mixture (M1), the second mixture (M2) and the third mixture (M3) into the first section of the reaction zone of the extruder to obtain a polymerizable mixture (pM) in the extruder,
e) adding at least one carbon material into the second section of the reaction zone of the extruder to the polymerizable mixture (pM) obtained in step d), to obtain a carbon containing polymerizable mixture (cpM) in the extruder,
f) polymerizing of the carbon containing polymerizable mixture (cpM) obtained in step e) in the third section of the reaction zone of the extruder to obtain a reinforced raw polyamide (rrP),
g) devolatilizing the reinforced raw polyamide (rrP) obtained in step f) in the devolatilization zone of the extruder to obtain the reinforced polyamide (rP), wherein the devolatilization zone comprises pressure built-up zones and stress relief zones and wherein a stripping fluid is added into the pressure built-up zones of the devolatilization zone of the extruder.

2. The process according to claim 1, wherein the extruder comprises a screw and wherein the length of the reaction zone is in the range from 16 to 60 times the diameter of the screw of the extruder.

3. The process according to claim 1, wherein the extruder comprises a screw having a diameter in the range from 18 to 140 mm.

4. The process according to claim 1, wherein the extruder comprises a screw and wherein the length of the devolatilization zone is in the range from 12 to 60 times the diameter of the screw of the extruder.

5. The process according to claim 1, wherein the extruder is selected from the group consisting of single screw extruders, twin screw extruders and multiple screw extruders.

6. The process according to claim 1, wherein the temperature ($T_d$) in the first section of the reaction zone of the extruder during step d) is in the range from 20 to 350° C.

7. The process according to claim 1, wherein the extruder comprises a screw and wherein the first section of the reaction zone of the extruder has a length in the range from 4 to 12 times the diameter of the screw of the extruder.

8. The process according to claim 1, wherein the temperature ($T_f$) in the third section of the reaction zone of the extruder during step f) is in the range from 100 to 350° C.

9. The process according to claim 1, wherein the extruder comprises a screw and wherein the third section of the reaction zone of the extruder has a length in the range from 12 to 44 times the diameter of the screw of the extruder.

10. The process according to claim 1, wherein the first mixture (M1) additionally comprises component (A1) at least one monomer selected from the group consisting of lactones, lactides, and alkylene oxides.

11. The process according to claim 1, wherein component (A) is selected from the group consisting of pyrrolidone, piperidone, ε-caprolactam, enantholactam, caprylolactam, capric lactam, and laurolactam.

12. The process according to claim 1, wherein component (B) is selected from the group consisting of alkali metal lactamates, alkaline earth metal lactamates, alkali metals, alkaline earth metals, alkali metal hydrides, alkaline earth metal hydrides, alkali metal hydroxides, alkaline earth metal hydroxides, alkali metal alcoholates, alkaline earth metal alcoholates, alkali metal amides, alkaline earth metal amides, alkali metal oxides, alkaline earth metal oxides, and organometallic compounds.

13. The process according to claim 1, wherein component (C) is selected from the group consisting of N-substituted lactams, diisocyanates, polyisocyanates, allophanates, and diacyl halides.

14. The process according to claim 1, wherein the at least one carbon material is selected from the group consisting of graphite, carbon black, graphene, carbon nanotubes, fullerenes, carbon nanobuds, carbon peapods, and carbon nanotori.

15. Reinforced polyamide (rP) obtained by a process according to claim 1.

* * * * *